United States Patent [19]

Lacorre

[11] 4,010,443
[45] Mar. 1, 1977

[54] VELOCITY PICKUPS OF THE HORIZONTAL SEISMOMETER TYPE
[75] Inventor: Jean-Baptiste Lacorre, Carquefou, France
[73] Assignee: Societe d'Etudes, Recherches et Constructions Electroniques Sercel, Carquefou, France
[22] Filed: Nov. 25, 1974
[21] Appl. No.: 526,880
[52] U.S. Cl. .................................. 340/17 R; 73/71; 73/71.2; 73/517 R
[51] Int. Cl.² ...................... G01V 1/16; H04R 23/00
[58] Field of Search ............ 340/17 R; 73/71.2, 71, 73/517 R; 181/122

[56] References Cited
UNITED STATES PATENTS

| | | | |
|---|---|---|---|
| 2,587,346 | 2/1952 | Loper et al. ........................ | 340/17 |
| 2,595,067 | 4/1952 | Flint .................................... | 73/71.2 |
| 2,754,434 | 7/1956 | Frank .................................. | 73/71.2 |
| 3,297,982 | 1/1967 | Beach ................................. | 73/71.2 |
| 3,636,774 | 1/1972 | Allison ............................. | 73/517 R |
| 3,685,011 | 8/1972 | Lehner ............................... | 340/17 |

Primary Examiner—H.A. Birmiel
Attorney, Agent, or Firm—Alan H. Levine

[57] ABSTRACT

The invention relates to an electromagnetic velocity pickup of the horizontal seismometer type, wherein an oscillating mass is elastically suspended as an inverted pendulum with the aid of a deformable system of the articulated parallelogram type. The pickup is characterized in that the suspension comprises rigid beams and at least one elastic pivot.

3 Claims, 3 Drawing Figures

VELOCITY PICKUPS OF THE HORIZONTAL SEISMOMETER TYPE

The present invention relates to velocity pickups used for detecting the velocity of a piece of ground and more particularly the horizontal component of this velocity. Such instruments are conventionally used in seismic prospecting for detecting the shocks originating from a seismic source (e.g. an explosion) and sent back (reflected or refracted) by the deep layers of the ground. They can also be used for analysing the modalities of an underground explosion, in particular an underground nuclear explosion. Throughout the following, in order to simplify explanation, only seismometers will be discussed, without this choice being restrictive.

Conventional horizontal electromagnetic seismometers essentially comprise at least one coil and at least one magnet capable of co-operating with the coil, one of these elements being fast with a rigid frame and the other being mounted on this frame through the medium of an elastically deformable suspension, the deformation of the suspension corresponding to a relative movement of the magnet and the coil. When a seismic disturbance or the like causes the ground to move, all the elements of the seismometer have a tendency to be carried along with its frame, but the suspended element, by reason of its inertia, has a tendency to acquire some delay, which causes a relative shifting, and then an oscillation, of the suspended element with respect to the unsuspended element. This relative movement thereby induces an electric voltage in the coil which constitutes the output signal of the seismometer.

FIG. 1 illustrates diagrammatically in vertical section the make-up of a conventional horizontal electromagnetic seismometer. This system comprises a frame B on which is mounted a magnet A having a horizontal axis H—H. A heavy assembly E having a mass M is mounted on such a frame through the medium of two elastically deformable suspension elements $S_1$ and $S_2$ so that it is able to oscillate along the horizontal axis H—H. The assembly E comprises two coils $B_1$ and $B_2$ with which the two ends of opposite poles of the magnet A co-operate in the manner of plunger cores in order to induce a voltage in the coils $B_1$ and $B_2$ which are electrically associated in an electric circuit at the output of which the electric signal of the seismometer appears. It can be seen that the mass M, the inertia of which constitutes a fundamental parameter of the instrument, is mounted as an inverted pendulum, forming the top side of an elastically deformable parallelogram.

A defect inherent in this type of instrument resides in the fact that it is impossible in practice, with the conventional elastic suspensions, to obtain low resonance frequencies, in particular resonance frequencies lower than one cycle per second, for the suspended mass. In fact, with conventional suspension systems, in which the vertical arms, or the elements constituting the vertical arms, of the articulted parallelogram are elastically deformable, it is generally impossible to obtain a suspension which is both sufficiently rigid and robust to support a very large mass M (the resonance frequency being inversely proportional to the square root of the suspended mass), while having a very low horizontal differential stiffness (the resonance frequency of the suspended mass being proportional to the square root of its elastic constant or differential stiffness).

The object of the present invention is to solve this problem and the invention proposes to this end, for a horizontal seismometer of the aforesaid type, a novel type of suspension for the suspended mass with respect to the frame, which comprises two rigid arms or assemblies articulated on the one hand to the frame and on the other hand to the suspended mass, and in that at least one of the articulations is constituted by a frictionless elastic pivot (axis immaterial), preferably of the type manufactured by the American group BENDIX and marketed under the name of FREE-FLEX.

Such a suspension has the advantage of low stiffness along the horizontal axis, while being able to support considerable loads.

DRAWINGS

Figure 1:
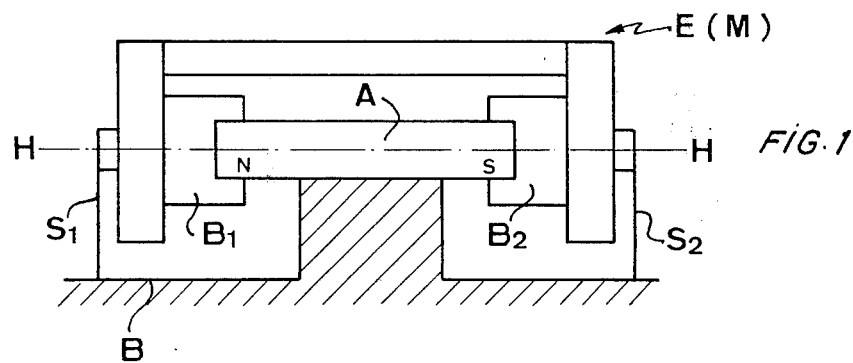
FIG. 1 shows a conventional seismometer which has already been described.
Figure 2:
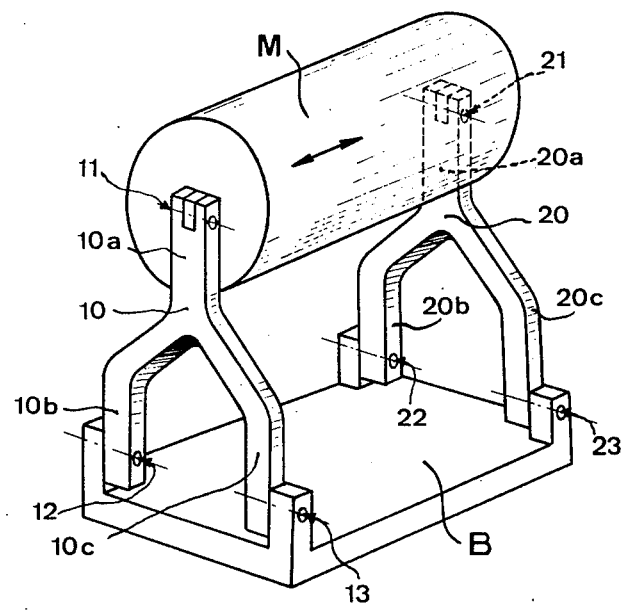
FIG. 2 shows the new suspension embodying the invention in perspective.

In FIG. 2, a suspended mass M is represented diagrammatically as a cylinder. In fact, this is, of course, a question of an assembly of generally cylindrical form incorporating coils for co-operating with a fixed central magnet (not shown).

The mass M is suspended on frame B with the aid of two non-deformable rigid beams 10 and 20, each beam comprising an upper branch 10a, 20a and two lower branches 10b, 10c; and 20b, 20c and thus having the general shape of an inverted letter Y. The branches 10a, 20a are articulated to the mass M at 11 and 21 and the branches 10b, 20b, and 10c, 20c are articulated to the frame B at 12, 22 and 13, 23, respectively. At least one of the articulations 11, 12, 13, 21, 22, and 23 is articulated by means of an elastic pivot of the aforesaid frictionless elastic pivot type, and preferably, all six articulations are pivots of this type.

Figure 3:
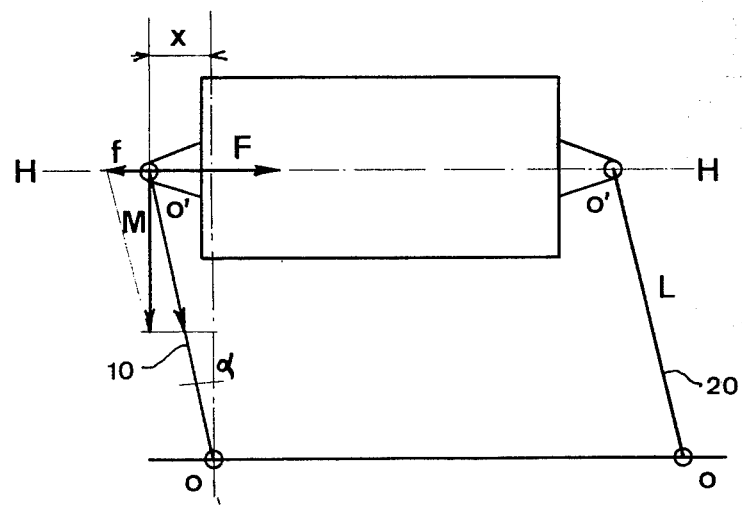
FIG. 3 illustrates diagrammatically the mechanical behaviour of this suspension.

There can be seen in FIG. 3 a diagram illustrating the operation of a suspension of this kind. With respect to the mean position of equilibrium, the deformation of the suspension, corresponding to the deformation of the parallelogram 0 0 0' 0' (the apices of which correspond respectively to the axes of the articulations 12, 13 – 22, 23 – 21, 11), can be expressed by an angular deflection $\alpha$ of the plane of the beams 10 and 20 from the vertical. The displacement of the centre of gravity of the mass M along a small circular arc substantially identical with a segment of length $x$ along the horizontal axis H—H brings about the appearance of a force $f$ proportional to the displacement $x$. The restoring force of the suspension is F, likewise proportional to $x$.

It can readily be shown that, for a small angle $\alpha$, the resonance frequency of the system is equal to $$\frac{\omega}{2\pi}, \text{ with } \omega^2 = \frac{1}{M}\left(\frac{Cr}{L^2} - \frac{Mg}{L}\right),$$

M being the movable mass expressed in kg, L the useful length (0 0') of the beams expressed in meters and Cr the sum of the restoring torques of the various elastic articulations mounted at 11, 12, 13, 21, 22, 23, the sum being expressed as Newton meters per radian, g being the acceleration of gravity in m/sec².

In a typical example in which six elastic pivots of the aforesaid type are used, a differential stiffness of 3.5 g/mm is obtained for a movable mass of 3,600 kg, the resonance frequency of the system being 0.5 cycle per second.

I claim:
1. A seismic pickup comprising:
   a. a base,
   b. two rigid beams pivotally mounted on said base, the pivot axes of said beams being parallel and said beams being spaced apart in a direction perpendicular to the pivot axes,
   c. a mass spaced above said base and mounted between said beams, said mass being connected to each beam by a pivot,
   d. said base, beams, and mass defining a parallelogram articulated at all four of its corners,
   e. each beam being articulated to said base on two spaced apart pivots located on a single pivot axis, and
   f. at least one of said pivots being an elastic pivot which constantly urges said beams and mass to a particular position with respect to said base,
   g. said mass having a resonant frequency below one cycle per second.
2. A seismic pickup as defined in claim 1 wherein all of said pivots are elastic pivots.
3. A seismic pickup as defined in claim 1 wherein each of said rigid beams has the shape of an inverted Y.

* * * * *